United States Patent
Ashworth

[11] 4,226,038
[45] Oct. 7, 1980

[54] PHOTO-SLIDE HANDLER AND VIEWER

[76] Inventor: John Ashworth, 101 Valley Oaks Dr., Santa Rosa, Calif. 95405

[21] Appl. No.: 25,983

[22] Filed: Apr. 2, 1979

[51] Int. Cl.³ .............................................. G02B 27/02
[52] U.S. Cl. ........................................ 40/361; 40/564; 40/575; 353/DIG. 1
[58] Field of Search ................. 40/361, 366, 367, 564, 40/575, 576, 476, 508, 509, 511; 353/DIG. 1; 206/456

[56] References Cited

U.S. PATENT DOCUMENTS

| | | | |
|---|---|---|---|
| 1,629,104 | 5/1927 | Honey | 40/361 |
| 2,812,056 | 11/1957 | Jenkins | 40/508 |
| 3,244,273 | 4/1966 | Niklund | 206/456 |
| 4,152,852 | 5/1979 | Brown | 40/361 |

FOREIGN PATENT DOCUMENTS

| | | | |
|---|---|---|---|
| 286952 | 12/1966 | Australia | 206/456 |
| 213762 | 3/1941 | Switzerland | 40/361 |

*Primary Examiner*—John F. Pitrelli
*Assistant Examiner*—G. Lee Skillington
*Attorney, Agent, or Firm*—Melvin R. Stidham

[57] ABSTRACT

A device for displaying photo-slides having a panel with a light source behind it and several sets of parallel rails to support photographic slides for viewing. Each set of rails has an upper and lower rail that are spaced to support the top and bottom of the back surface of the photo-slides, and on the upper rail there is a series of pick off teeth with a stop surface protruding above the rail at a height slightly less than the thickness of a photo-slide. A slide handler box receives a stack of photo-slides and slides along, astride the upper and lower rails so that as the stack engages a pick-off tooth, a single photo-slide is engaged, stripped away, and stopped in place on the rail. The back of the handler box has an opening at the bottom just wide enough to allow one photo-slide to pass. The upper rail has a shorter support rail alongside it and the lower rail has a taller support rail alongside it, so that when the panel is tilted, the photo-slides fall off the upper and lower rails to be supported on the upper side of the lower support rail, free of restraint of the pick-off teeth. Therefore, when the panel is lowered, the photo-slides are free to slide along the upper slide support rail and the lower rail and are aligned by the rails for stacking in the handler box.

10 Claims, 12 Drawing Figures

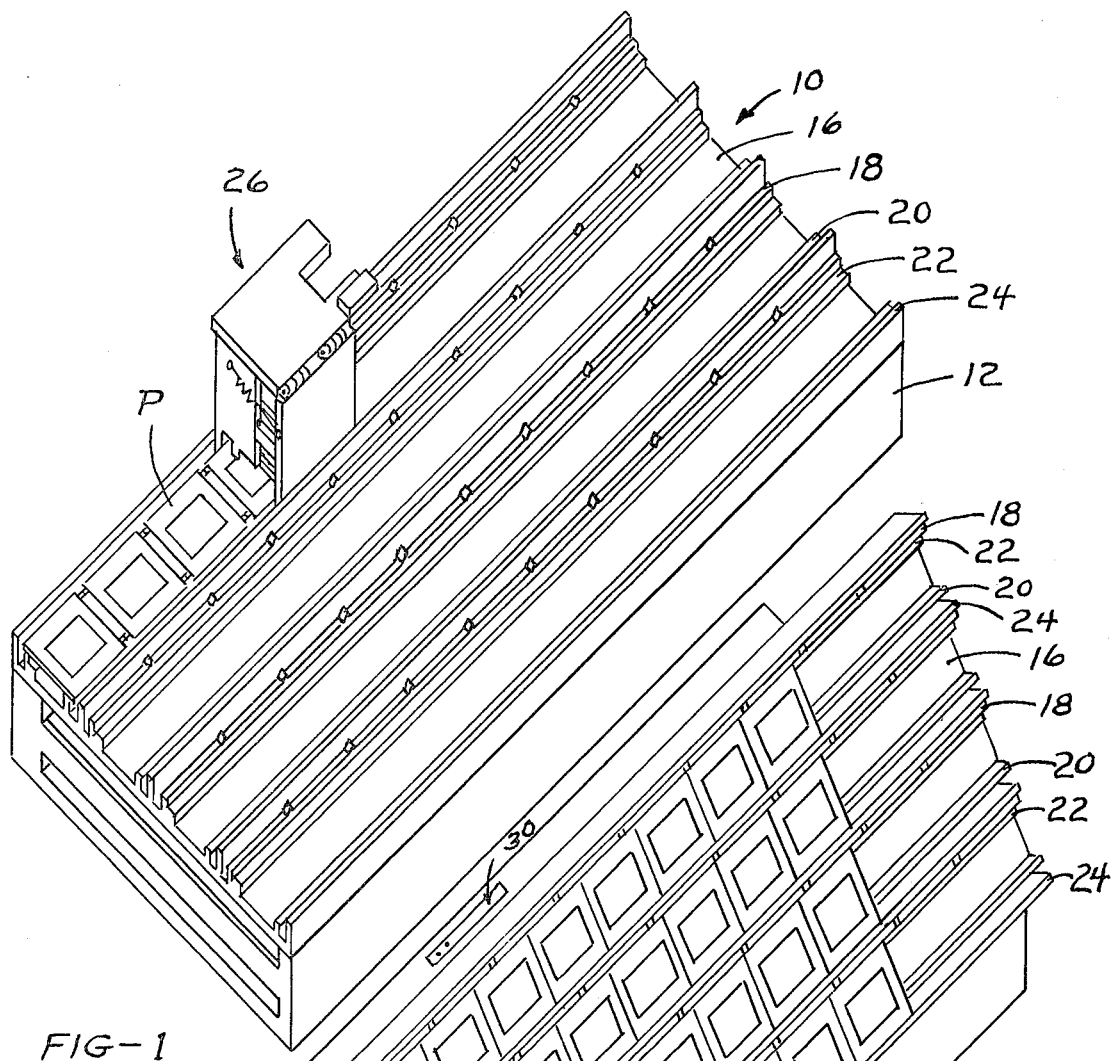
FIG-1
FIG-2
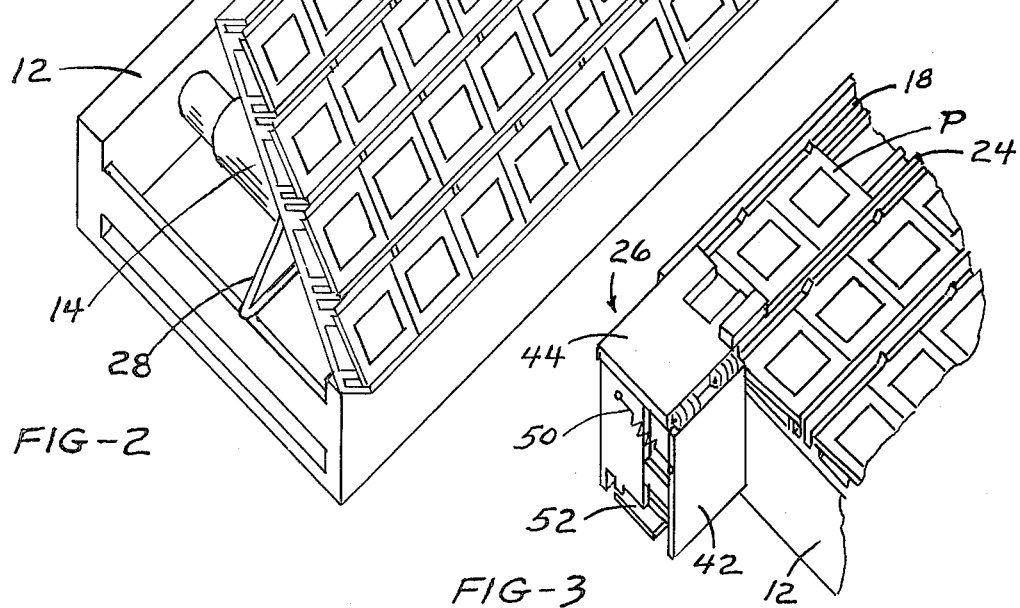
FIG-3

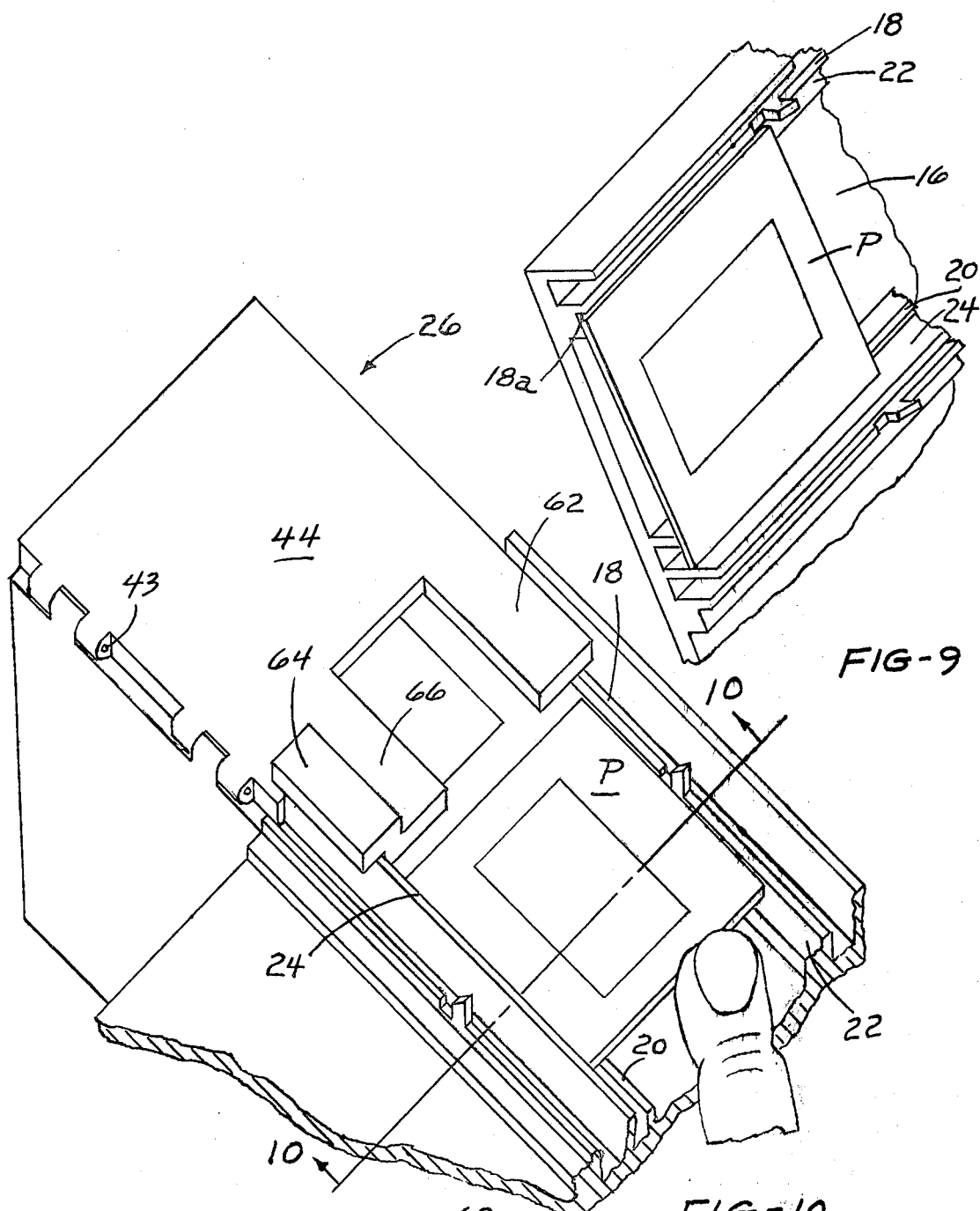
FIG-9
FIG-10
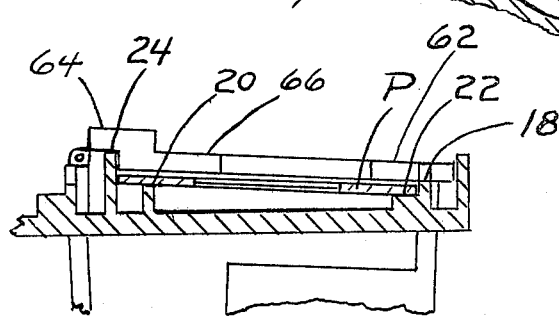
FIG-11

PHOTO-SLIDE HANDLER AND VIEWER

BACKGROUND OF THE INVENTION

It is common practice to store photo-slides in small boxes, slide stack files, trays and the like, from which they must be removed for viewing. For preliminary viewing, editing and culling out slides, it is common practice to arrange a group of slides over a translucent panel with a light behind it. Various means have been suggested for arranging the slides over such a panel, but there is no known device or apparatus for taking a series of slides which have been stacked in a specific order arranging them across a light panel for viewing; and then retrieving them in precisely the same order and orientation.

OBJECTS OF THE INVENTION

It is an object of this invention to provide a device for quickly and easily arranging a stack of slides across a light panel for viewing or editing.

It is a further object of this invention to provide a device for taking a stack of slides which have been arranged in a particular sequence; spreading them over a light table for viewing; and then retrieving them in precisely the same sequence and orientation.

It is a further object of this invention to provide a device for distributing photo-slides over a viewing panel that requires a minimum amount of handling.

Other objects and advantages of this invention will become apparent from the description to follow, particularly when read in conjunction with the accompanying drawings.

SUMMARY OF THE INVENTION

In carrying out this invention, I provide a panel of translucent material with a source of light behind it. A plurality of pairs of rails extend from side to side across the face of the panel. Each group of rails has a first pair of the same height, spaced apart to support a photo-slide across the top and bottom edges thereof. The uppermost rail of each set has a series of pick-off teeth, which are spaced along the length of the rail and which are of a height slightly less than the thickness of a photo-slide so that as a stack of slides is moved along the rail, the bottom slide will engage the tooth and stop, being withdrawn from the stack. The uppermost rail of the first pair has a short rail running along side it and the lowermost rail has a relatively tall rail adjacent to it. Hence, if the panel is tilted up in viewing position, the slides will slide from the first pair of rails to be supported on the side of the lowermost rail, tilted back against the short upper rail, free of the pick-off teeth on the rail above and, therefore free to slide along the rails, guided into alignment with a slide handler for stacking. The slide handler carries a stack of photo-slides and may be moved along astride the first pair of rails so that successive lowermost slides therein engage the pick-off teeth, which "peel" them from the stack to deposit them on the rails in a row. The back wall of the carrier terminates above the first pair of rails by a distance sufficient to allow the egress of just a single photo-slide. The top wall has a forward extension with means thereof supporting the distributor box on the top first rail and tall second rail, leaving a space under the extension to receive the slides and guide them into the box as a complete row of slides is pushed across the board from the opposite end.

BRIEF DESCRIPTION OF THE DRAWINGS

In the drawings

FIG. 1 is a view in perspective of the photoslide handler and viewing board of this invention as disposed for placing slides on the board;

FIG. 2 is a view in perspective of the viewing panel with slides thereon as raised for viewing, and release of slides from restraint of pick-off teeth.

FIG. 3 is a partial view in perspective of the viewing board and with the slide handler disposed to retrieve slides therefrom;

FIG. 9 is a partial view in perspective of a photo-slide as positioned for viewing and free of the restraint of pick-off teeth;

FIG. 10 is a view in perspective of a lightboard portion and the slide handler as positioned for retrieving slides from the board;

FIG. 11 is a section view taken along line 10—10 of FIG. 10; and

DESCRIPTION OF PREFERRED EMBODIMENTS

Figure 4:
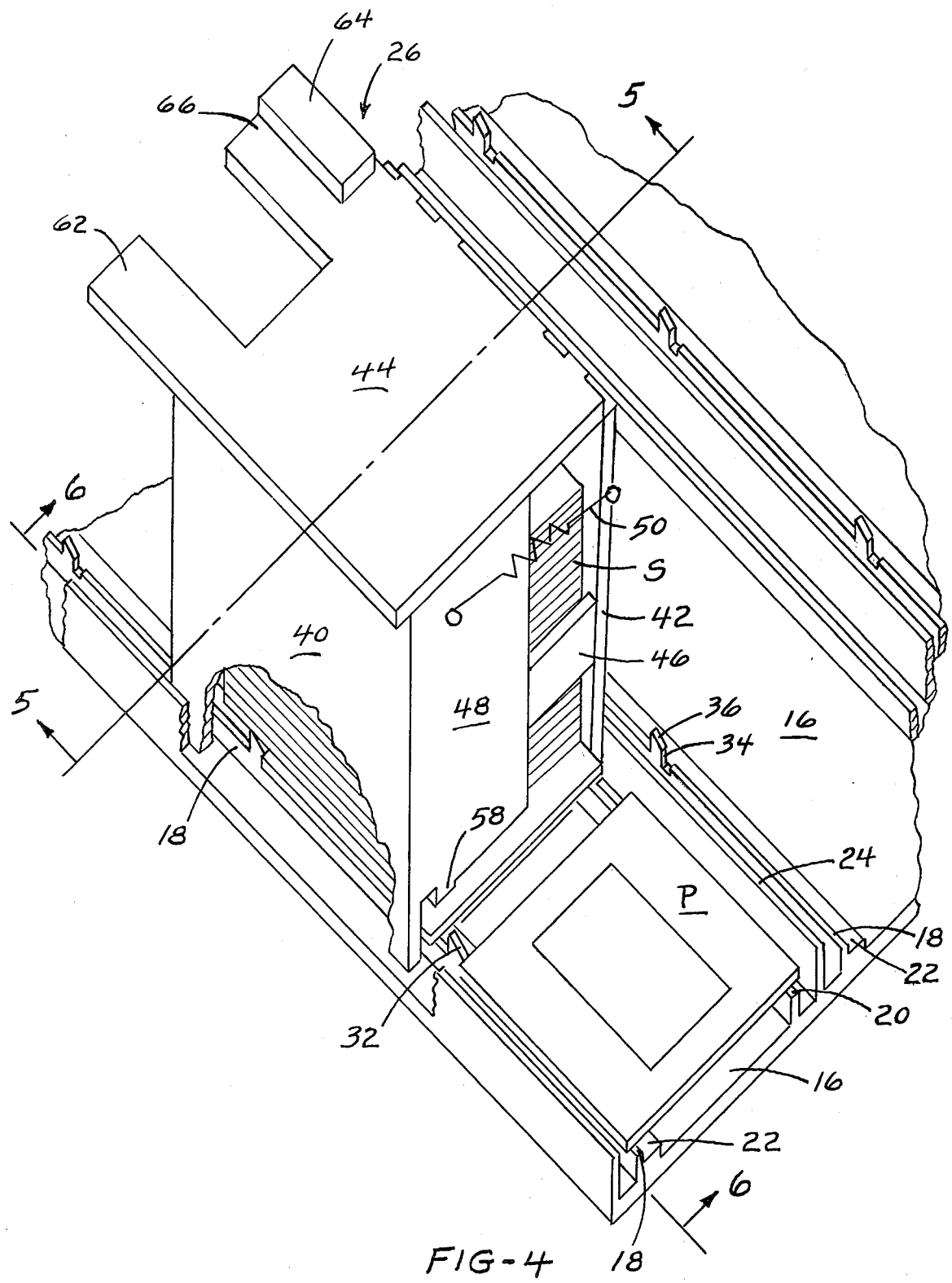
FIG. 4 is an enlarged view in perspective of the photo-slide handler as disposed for depositing slides on the viewing board.

The Embodiment of FIGS. 1 to 11

Referring to FIGS. 1, 2 and 3 with greater particularity, the slide viewing board 10 of this invention includes a box 12 in which is carried sources of light 14 (FIG. 2) and which is covered with a panel 16 of a translucent material. Across the width of the panel 16 extends a plurality of pairs of upper and lower rails 18 and 20 and upper and lower slide support rails 22 and 24.

In FIG. 1, the translucent panel 16 is closed and in horizontal position, wherein the photo-slides handler, also forming a feature of this invention, moves along the upper and lower rails 18 and 20 to distribute photo-slides along the surfaces thereof. As used herein, the term "photo-slides" is intended to cover cards or tile-like items which are advantageously arranged along a board or panel for viewing. After the photo-slides P are so disposed, the panel 16 may be raised to the position shown in FIG. 2 wherein it is held by suitable braces 28. Raising of the panel 16 may energize a switch 30 to increase the illumination of the light source 14 for improved viewing. Finally, after the slides have been viewed, the photo handler box 26 is positioned at the end of the rails 18 and 20 to retrieve slides P pushed therealong.

Figure 5:
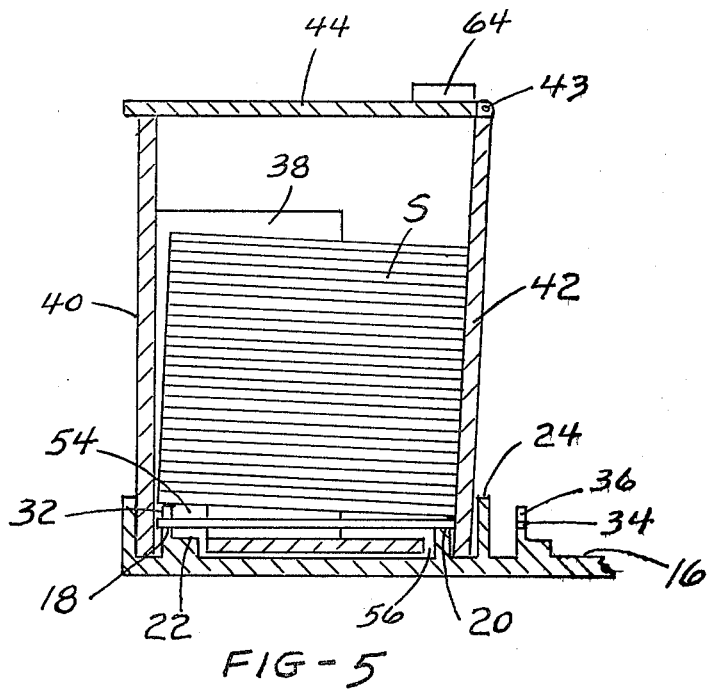
FIG. 5 is a section view taken along line 5—5 of FIG. 4.
Figure 6:
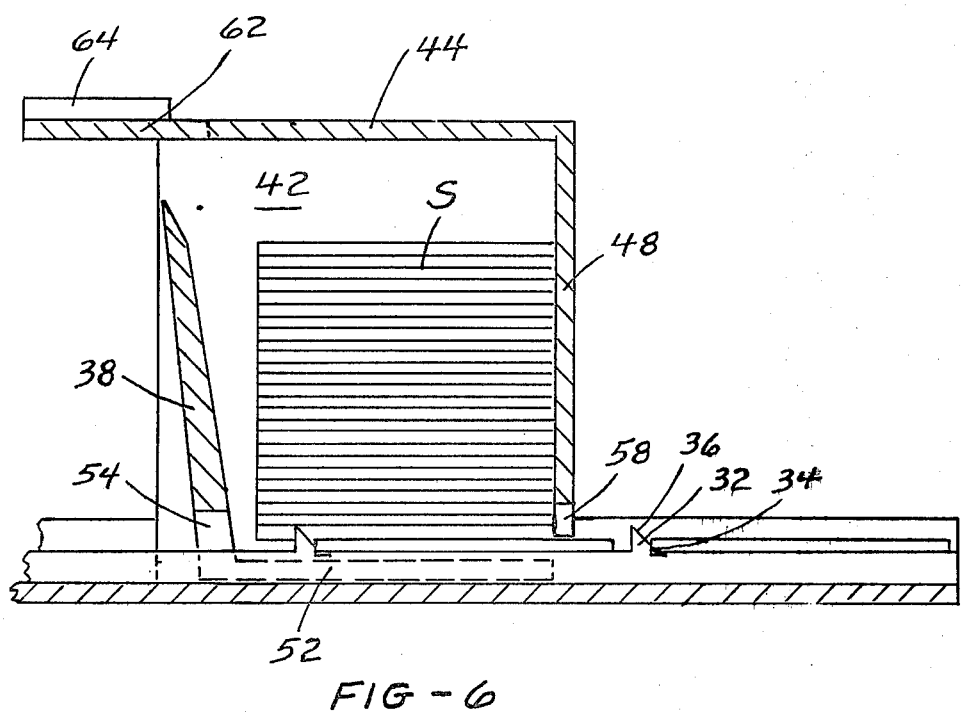
FIG. 6 is a section view taken along line 6—6 of FIG. 4.

Referring now more closely to FIGS. 4, 5 and 6, the upper and lower rails 18 and 20 are preferably of approximately the same height and disposed along one of them, at regular intervals, is a series of pick-off teeth 32 having a leading surface 34 having a height from the rail of slightly less than the thickness of a photo-slide P so that as the photo handler 26, having slide surfaces at the lower edges of the side walls 40,42, moves along astride the rails 18 and 20 a single slide will be engaged from the bottom of the stack S contained in the photo handler 26 and deposited on the rails 18 and 20. The pick-off teeth 32 are spaced apart slightly more then the width of a photo-slide P so that a photo-slide will be deposited at each pick-up tooth 32 along the length of the rails 18 and 20.

Immediately following the vertical slide engaging tooth surface 34 is a cam surface 36 which engages under the second slide in the stack S to raise one side of the stack S, as shown in FIGS. 4, 5 and 6, and thereby to minimize face to face engagement and sliding contact with the bottom slide P being deposited.

Figures 7, 8:
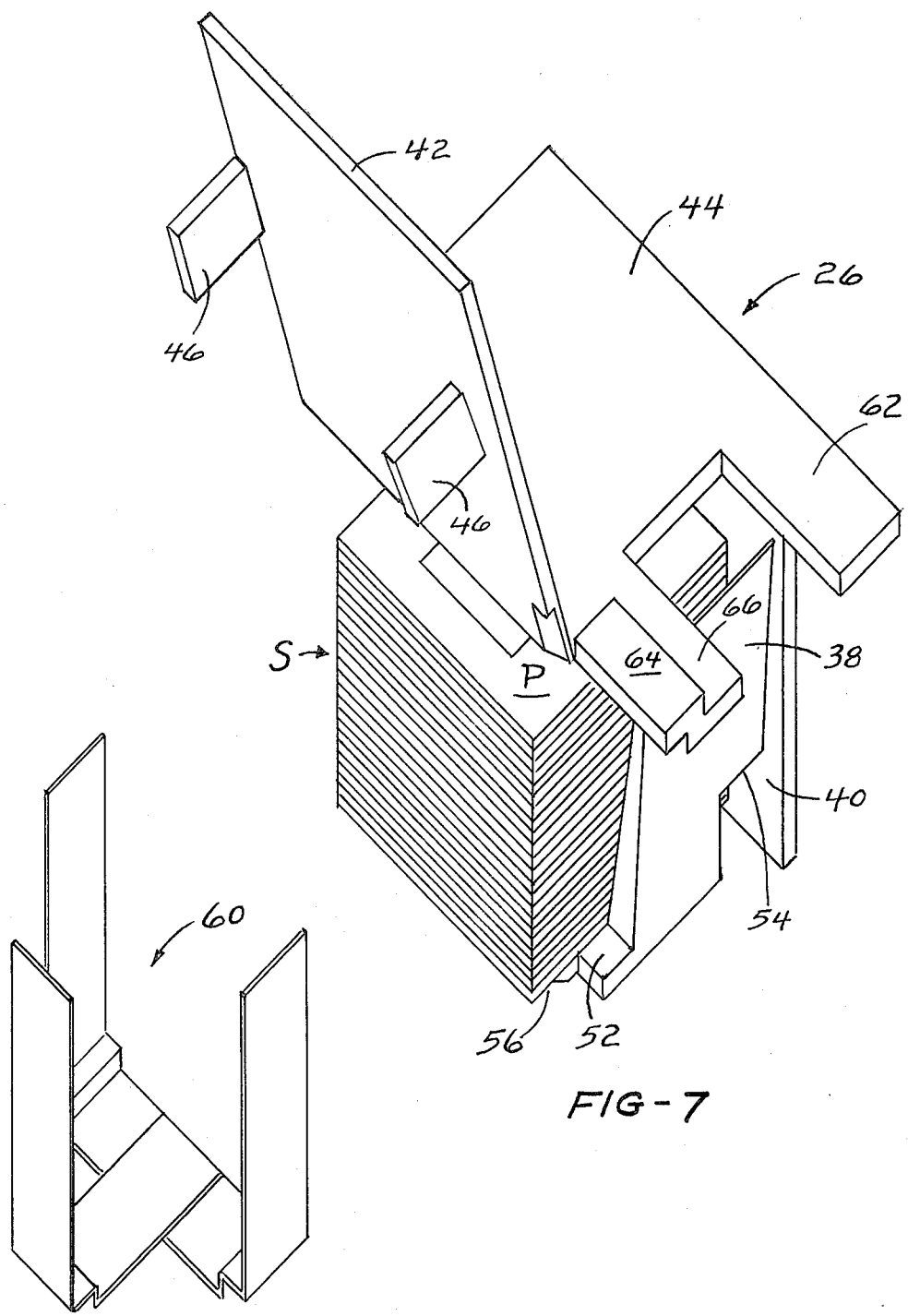
FIG. 7 is a view in perspective taken from the rear of the photo-slide handler.
FIG. 8 is a view in perspective of a device for handling a multiplicity of photo-slides as a unit.
Figure 12:
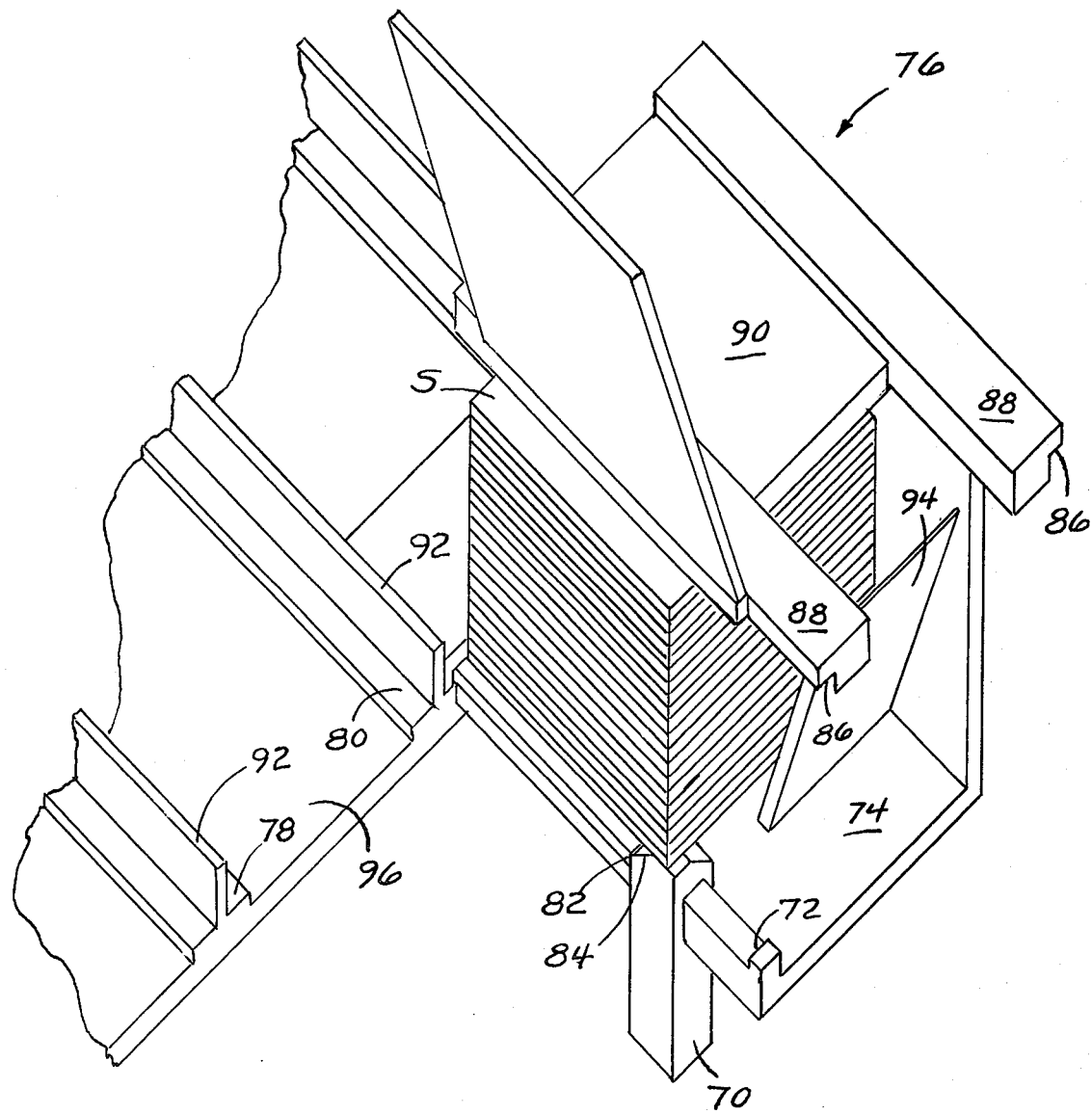
FIG. 12 is a view in perspective of another embodiment of this invention.

As shown most clearly in FIGS. 6 and 7, the front wall 38 of the photo handler 26 is secured to only one side wall 40 with the other side wall 42 being hinged at 43 to the top wall 44 to enable placement and removal of the stack S of the photo-slides P. Suitable stops 46 engage the sides of the front and back walls 38 and 48 (FIG. 3) and an over center spring 50 pulls the pivoted side wall 42 in either closed or open position to which it may pivoted.

The bottom wall or support 52 is carried by the front wall 38 and is spaced from the side walls 40 and 42 with an opening 54 and 56 insuring clearance with the rails 18, 20 and 22. A back wall 48 includes a stop member 58 which blocks passage of all but the lowermost photo-slide P so that only one slide at a time may be dropped by engaging with the pick-off finger 32.

As seen in FIGS. 4 and 7 the front and rear walls 38 and 48 are displaced from the side wall 42 a sufficient distance to enable placement of suitable securing means such as a rubber band around the exposed edges of the stack S of photo-slides P or for grasping the stack with a stack clip of a commercially available type. FIG. 8 shows a stack carrier 60 which could be used to transfer a stack of slides between the slide handler 26 and a slide storage cube.

In operation, the slide handler is placed on the panel 16 with the lower edges of the side walls 40 and 42 astride the rails 18 and 20 and simply moved along each pair of rails from one end to the other until a series of slides had been positioned. Then, the handler is lifted and moved to the next row, starting again at the left, and another row is deposited. This is continued until a full stack S of slides is on the table 16 for viewing. Then, the table 16 is raised to the position shown in FIG. 2 and 9, whereby the photoslides P will drop from the rail 18 to be supported on the slide support rails 22 and 24, as well as the rail 20. As shown particularly in FIG. 9, the rail 24 is higher then the adjacent rail 20 so that the photo-slide P is supported on the side of the support 24 leaning back against the rail 22 which is shorter then the adjacent rail 18. Thus, the photo-slide P is caused to be free of engagement with the pick-off teeth 32 and is now free to slide horizontally along the rails, allowing complete flexibility in moving the slides about for editing and sequencing. In addition, the ledge 18a formed by the side of rail 18 insures the slide P will not move back onto the rail 18 when the table 16 is again moved to its horizontal position and serves as a guide to align with the slide handler 26 for retrieving and stacking.

After the photo-slides P have been viewed, the handler 26 is moved to position shown in FIGS. 3 and 10, disposed along the end of the table 16 with an extension 62 of the top panel 44 supported on the rail 18 and a slightly elevated platform 64 on an extension 66 supported on the bottom photo support rail 24. As shown in FIG. 11, this leaves just enough clearance under the extension 62 and 66 to receive a photo-slide P sliding along the rails 20 and 22, and the extensions restrain the photo-slide in a horizontal plane until the slide is almost completely in the slide handler 26, ensuring that the slide is deposited therein in both proper sequence and orientation. Then, as shown in FIG. 10, the entire row of photo-slides is pushed along the rails 20 and 22 to be received under the extensions and into the container of the photo-slide handler 26. The space between the extensions 62 and 66 enables entry of the person's finger to insure complete delivery of the photoslides P. Entry of the photoslides is facilitated by disposing the front wall 38 at an angle, as shown in FIG. 6.

THE EMBODIMENT OF FIG. 12

In this embodiment a pick-off finger 70 is slidable on a rail 72 on the bottom panel of a slide handler 76. The handler is positioned at the end of rails 78 and 80 and the finger 70 reciprocated so that at each stroke a surface 82 on the finger will engage and "deal off" the lowermost slide S and a cam surface 84 will lift the edges of slides above it. Each slide as "dealt" pushes the preceeding slides along the rails 78 and 80 ahead of it.

In this embodiment, the slides are retrieved by seating recesses 86 in extensions 88 of the top wall 90 on tall rails 92 disposed adjacent the rails 78 and 80. The slides are then pushed along the rails 78 and 80 and under the extension 88 to drop in sequence behind the sloping back wall 94 of the slide handler 76. This should be done from the other side of the board 96 so that the first slide deposited will be the first slide retrieved.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. A device for displaying photo-slide comprising:
   a panel;
   upper and lower rails on the panel;
   the upper and lower rails are parallel and are spaced to support the tops and bottoms of the flat, back surfaces of photo-slides;
   a slide handler box for receiving a stack of photo-slides and having side walls, back wall, and a bottom support spaced from said side walls;
   slide surfaces, at the lower edges of said side walls, to slide along said panel astride said upper and lower rails with a stack of photo-slides supported in said handler box; and
   pick-off teeth, each with a stop surface of a height slightly less than the thickness of a photo-slide, along one of said upper and lower rails, said teeth being spaced slightly more than the width of a photo-slide so that, as said box is moved along said upper and lower rails, a photo-slide is picked off by each of said teeth and deposited on said upper and lower rails.

2. The slide display device defined by claim 1 including:
   stop means on the lower edge of said back wall to prevent egress of more than one photo-slide at a time.

3. The slide display device defined by claim 2 including:
   cam means on said pick-off teeth of adjacent said stop surfaces in the direction of handler box movement to engage and lift adjacent edges of a stack of photo-slides supported on a photo-slide in engagement with said stop surface.

4. The slide display device difined by claim 1 including:
   a pair of support rails, closely spaced, respectively, to said upper and lower rails and spaced from each other to support a row of photo-slides thereon;
   the lower one of said pair of support rails being higher than the lower rail so that if said panel is tilted up from a horizontal plane, photo-slides partially supported on said upper rail will slide off to be supported on the then upper side surface of the lower one of said support rails.

5. The slide display device defined by claim 4 wherein:
   the upper one of said support rails being lower than the upper rail to form a shoulder therewith so that photo-slides supported thereon are free to slide therealong longitudinally thereof without engaging said pick-off teeth guided by said shoulder.

6. The slide display device defined by claim 4 including:
   a partial front wall on said handler box intermediate and shorter than said side walls;
   a top wall over said side walls extending forwardly thereof, said forward extension being supportable on the upper one of said upper and lower rails with said handler box disposed alongside said panel to receive photo-slides pushed along the upper one of said support rails and hold same in a horizontal plane.

7. The slide display device defined by claim 6 including:
   a recess in said forward extension to enable entry of a person's finger pushing a row of photo-slides along said second pair of rails.

8. The slide display device defined by claim 6 wherein:
   said front wall is sloped forward to facilitate entry of photo-slides.

9. The slide display device defined by claim 6 including:
   means along one side of said top wall for supporting same on the lower support rail.

10. The slide display device defined by claim 1 wherein:
    one of said side walls in pivotable for access to the interior of said handler box.

* * * * *